United States Patent

Sundararaman

[11] Patent Number: 5,905,121
[45] Date of Patent: May 18, 1999

[54] ACTIVE ESTER URETHANE CROSSLINKING AGENTS AND THEIR USE IN FILM-FORMING COMPOSITIONS

[75] Inventor: Padmanabhan Sundararaman, McCandless Township, Pa.

[73] Assignee: PPG Industries, Inc., Pittsburgh, Pa.

[21] Appl. No.: 08/994,610

[22] Filed: Dec. 19, 1997

[51] Int. Cl.$^6$ ............ C08F 20/00; C08G 18/81
[52] U.S. Cl. ............ 525/450; 528/45; 528/67; 528/80; 525/452; 525/509; 525/510; 525/512; 525/540; 524/178; 524/186
[58] Field of Search ............ 528/45, 67, 80; 525/450, 452, 509, 510, 512, 540; 524/178, 186

[56] References Cited

U.S. PATENT DOCUMENTS

| | | | |
|---|---|---|---|
| 4,252,703 | 2/1981 | Patzschke et al. | 260/29.2 EP |
| 4,364,860 | 12/1982 | Patzschke et al. | 525/127 |
| 4,373,059 | 2/1983 | Patzschke et al. | 524/761 |
| 4,373,072 | 2/1983 | Patzschke et al. | 525/438 |
| 5,130,405 | 7/1992 | Walker et al. | 528/78 |
| 5,155,201 | 10/1992 | Gardon et al. | 528/78 |
| 5,175,227 | 12/1992 | Gardon et al. | 528/45 |

FOREIGN PATENT DOCUMENTS

| | | |
|---|---|---|
| 361587 | 3/1981 | Australia . |
| 378783 | 9/1985 | Australia . |
| 383818 | 8/1987 | Australia . |
| 726 284 A1 | 12/1995 | European Pat. Off. . |
| 51-139830 | 2/1976 | Japan . |
| 52-25830 | 2/1977 | Japan . |

OTHER PUBLICATIONS

Polyurethane Polyols: Ester–Bond Free Resins For High Solids Coatings—1992 Joseph J. Mattiello Memorial Lecture, John L. Gardon, Akzo Coatings Inc.

*Primary Examiner*—Samuel A. Acquah
*Attorney, Agent, or Firm*—Dennis G. Millman

[57] ABSTRACT

An active ester compound having an alkoxy group is provided having the structure:

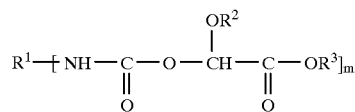

wherein:
$R^1$ is derived from a polyisocyanate $R^1(NCO)_m$ reacted with an active hydrogen-containing material to form the urethane group in the compound;
m is an integer of at least 2; and
$R^2$ and $R^3$ are independently alkyl groups having from 1 to 4 carbon atoms.

The compound is useful as a crosslinking agent when combined with active hydrogen-containing resinous binders in curable film-forming compositions.

12 Claims, No Drawings

ACTIVE ESTER URETHANE CROSSLINKING AGENTS AND THEIR USE IN FILM-FORMING COMPOSITIONS

BACKGROUND OF THE INVENTION

Curable film-forming coating compositions have long been used in automotive and other industrial manufacturing fields. Curable compositions, that is, compositions that form hard surface protecting layers by chemical crosslinking offer better protection (as opposed to lacquers) to substrates because of their ability to resist damage by solvents, acids, and other chemicals, and effects of weathering. In order to cure by crosslinking, curable coating compositions contain chemical groups that are reactive under curing conditions to effect the required crosslinking.

A variety of crosslinking agents are utilized in curable compositions, including polyacids, aminoplasts, and polyisocyanates. Each type of crosslinking agent undergoes different chemical reactions with resinous binders, depending on the respective functionality of the crosslinking agents and binders. Each crosslinking agent also has its own advantages and drawbacks associated with it.

Among the available crosslinking agents are active ester functional materials. An active ester functional material is an ester functional compound having at least one hetero atom (nitrogen, oxygen, halogen, and the like) attached to the alpha carbon, rendering the ester group more reactive than an unsubstituted ester. By "more reactive" is meant that active esters may undergo transesterification or amidation more readily than unsubstituted esters, i. e., at lower temperatures or even at room temperature. The greater the number of hetero atom substitutions, the greater the reactivity.

Austrian Patent No. 361,587 discloses an electrodepositable curable composition comprising an active ester functional material (e. g., a polyisocyanate reacted with ethyl lactate) and an amino functional resinous binder, which may undergo amidation during cure. The composition disclosed is curable only at elevated temperatures.

Aminoplasts are also curable at elevated temperatures. Compositions containing aminoplasts may also contain free formaldehyde which is used in the preparation of aminoplasts, which may be undesirable.

Coating compositions containing free polyisocyanates can be cured at room temperature and yield coatings having urethane linkages which are highly resistant to chemical attack, but polyisocyanates having free isocyanate functionality are known to require special handling and environmental precautions. Curable compositions containing blocked polyisocyanates often require elevated temperatures to deblock the isocyanate groups and effect cure.

It would be desirable to provide compositions that may be used as crosslinking agents in curable film-forming compositions, wherein the compositions are formaldehyde free and curable at temperatures as low as ambient.

SUMMARY OF THE INVENTION

In accordance with the present invention, an active ester compound having an alkoxy group is provided having the structure:

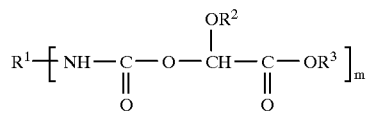

wherein:
$R^1$ is derived from a polyisocyanate $R^1(NCO)_m$ reacted with an active hydrogen-containing material to form the urethane group in structure (I), and may include a wide range of substituted and unsubstituted alkyl, cycloalkyl, aryl and alkylaryl groups corresponding to the backbone structures of commercially available polyisocyanates;

m is an integer of at least 2; and $R^2$ and $R^3$ are independently alkyl groups typically having from 1 to 4 carbon atoms.

The oxygen atom in the urethane linkage and the oxygen in the $-OR^2$ alkoxy substituent on the alpha carbon render the ester "active," i. e., more reactive than an unsubstituted ester (and more reactive than an ester having only one hetero atom substituent) with respect to transesterification reactions.

Also provided are curable film-forming compositions comprising the compound described above, a resinous binder, and (when needed) a catalyst.

DETAILED DESCRIPTION

Not intending to be bound by theory, it is believed that the active ester compounds of the present invention react with amino and ketimine groups via an amidation reaction mechanism. The active ester compound of the present invention may alternatively react with amino groups by deblocking as an isocyanate and undergoing an isocyanate-amino reaction mechanism. Again, not intending to be bound by theory, the active ester compound of the present invention may react with hydroxyl groups by transesterification or by deblocking as an isocyanate and undergoing an isocyanate-hydroxyl reaction mechanism.

The compound of the present invention may be prepared by reacting a polyisocyanate having the structure $R^1-(N=C=O)_m$ with an alkyl hemiacetal of an alkyl glyoxylate, under reaction conditions typically used for isocyanate-hydroxyl reactions. The hemiacetal of the alkyl glyoxylate may have the structure:

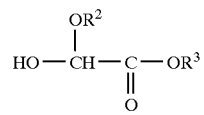

where $R^2$ and $R^3$ are as defined above.

Suitable polyisocyanates used to prepare the active ester compound of the present invention include aliphatic or aromatic polyisocyanates or mixtures thereof. Examples of suitable aliphatic diisocyanates are straight chain aliphatic diisocyanates such as 1,4-tetramethylene diisocyanate and 1,6-hexamethylene diisocyanate. Also, cycloaliphatic diisocyanates can be employed. Examples include isophorone diisocyanate and 4,4'-methylene-bis-(cyclohexyl isocyanate). Examples of suitable aromatic diisocyanates are p-phenylene diisocyanate, diphenylmethane-4,4'-diisocyanate and 2,4- or 2,6-toluene diisocyanate. Examples of suitable higher polyisocyanates are triphenylmethane-4, 4',4"-triisocyanate, 1,2,4-benzene triisocyanate and polymethylene polyphenyl isocyanate. Preferred polyisocyanates include biurets and isocyanurates of diisocyanates, including mixtures thereof, such as the isocyanurate of hexamethylene diisocyanate, the biuret of hexamethylene diisocyanate and the isocyanurate of isophorone diisocyanate.

Isocyanate prepolymers, for example, reaction products of polyisocyanates with polyols such as neopentyl glycol and trimethylol propane or with polymeric polyols such as polycaprolactone diols and triols (NCO/OH equivalent ratio greater than one) can also be used.

In the hemiacetal of structure (II), $R^2$ and $R^3$ may be linear or branched alkyl groups having from about 1 to about 4 carbon atoms, including methyl, ethyl, methyl ethyl, isobutyl, and the like. Both $R^2$ and $R^3$ are typically methyl groups. For example, the methyl hemiacetal of methyl glyoxylate is commercially available and also easy to prepare.

The methyl hemiacetal of methyl glyoxylate may be prepared as follows: glyoxylic acid is reacted with methanol under typical esterification conditions as known to those skilled in the art to form methyl glyoxylate. After esterification, the methanol may be further reacted with the ester to form the hemiacetal. This hemiacetal is also available commercially as GMHA from Chemie Linz International.

The active ester compound of the present invention may be combined with suitably functional (i. e., groups reactive with the active ester group or with isocyanates) resinous binders and catalysts as necessary to form curable film-forming compositions. The active ester as a crosslinking agent is present in the film-forming composition in an amount of about 10 to about 50 percent by weight, preferably about 20 to about 40 percent by weight, based on the total weight of resin solids in the film-forming composition.

The resinous binder in the film-forming composition contains functional groups that are reactive with esters and/or isocyanates; i. e., active hydrogen groups. Such functional groups may be selected from, inter alia, hydroxyl, primary amino, secondary amino, ketimine and mixtures thereof.

Suitable resinous binders include polymers typically used in film-forming compositions, such as acrylic polymers, polyesters, including alkyd, polyepoxides, polyethers and polyurethanes.

The acrylic polymers are copolymers of one or more alkyl esters of acrylic acid or methacrylic acid optionally together with one or more other polymerizable ethylenically unsaturated monomers. Suitable alkyl esters of acrylic acid or methacrylic acid include methyl methacrylate, ethyl methacrylate, butyl methacrylate, ethyl acrylate, butyl acrylate, and 2-ethyl hexyl acrylate. Suitable other copolymerizable ethylenically unsaturated monomers include vinyl aromatic compounds such as styrene and vinyl toluene; nitriles such acrylonitrile and methacrylonitrile; vinyl and vinylidene halides such as vinyl chloride and vinylidene fluoride and vinyl esters such as vinyl acetate.

Functional groups such as hydroxyl and amino groups may be incorporated into the acrylic polymer by using functional monomers such as hydroxyalkyl acrylates and methacrylates or aminoalkyl acrylates and methacrylates. Amino groups may be converted to ketimine groups by reaction with ketones using known reaction conditions.

Besides acrylic polymers, the resinous binder for the film-forming composition may be an alkyd resin or a polyester. Such polymers may be prepared in a known manner by condensation of polyhydric alcohols and polycarboxylic acids. Suitable polyhydric alcohols include, for example, ethylene glycol, propylene glycol, butylene glycol, 1,6-hexylene glycol, neopentyl glycol, diethylene glycol, glycerol, trimethylol propane, and pentaerythritol.

Examples of suitable polycarboxylic acids used to prepare the polyester binder include succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides where they exist or lower alkyl esters of the acids such as the methyl esters may be used.

Where it is desired to produce air-drying alkyd resins, suitable drying oil fatty acids may be used and include those derived from linseed oil, soya bean oil, tall oil, dehydrated castor oil, or tung oil.

The polyesters and the alkyd resins may contain a portion of free hydroxyl groups (done by using excess polyhydric alcohol during preparation of the polyester or alkyd) which are available for crosslinking reactions.

Suitable polyepoxides for use as resinous binders in the film-forming composition of the present invention preferably have at least two 1,2-epoxy groups. The epoxy compounds may be saturated or unsaturated, cyclic or acyclic, aliphatic, alicyclic, aromatic or heterocyclic. They may contain substituents such as primary and/or secondary amino, hydroxyl, and ether groups.

Examples of polyepoxides are those having a 1,2-epoxy equivalency greater than one and preferably about two; that is, polyepoxides which have on average two epoxide groups per molecule. Polyglycidyl ethers of polyhydric alcohols such as cyclic polyols are suitable, as are polyglycidyl ethers of polyhydric phenols such as Bisphenol A. These polyepoxides can be produced by etherification of polyhydric phenols with an epihalohydrin or dihalohydrin such as epichlorohydrin or dichlorohydrin in the presence of alkali. Besides polyhydric phenols, other cyclic polyols can be used in preparing the polyglycidyl ethers of cyclic polyols. Examples of other cyclic polyols include alicyclic polyols, particularly cycloaliphatic polyols such as 1,2-cyclohexane diol and 1,2-bis(hydroxymethyl)cyclohexane. Epoxy group-containing acrylic polymers can also be used.

The polyepoxides may be chain extended using polyhydroxyl group-containing materials. Examples of polyhydroxyl group-containing materials used to chain extend or increase the molecular weight of the polyepoxide (i. e., through hydroxyl-epoxy reaction) include alcoholic hydroxyl group-containing materials and phenolic hydroxyl group-containing materials. Examples of alcoholic hydroxyl group-containing materials are simple polyols such as neopentyl glycol; polyester polyols such as those described in U.S. Pat. No. 4,148,772; polyether polyols such as those described in U.S. Pat. No. 4,468,307; and urethane diols such as those described in U.S. Pat. No. 4,931,157. Examples of phenolic hydroxyl group-containing materials are polyhydric phenols such as bisphenol A, phloroglucinol, catechol, and resorcinol. Mixtures of alcoholic hydroxyl group-containing materials and phenolic hydroxyl group-containing materials may also be used.

Examples of polyether polyols that may be used as resinous binders in the film-forming compositions of the present invention are polyalkylene ether polyols.

Also useful are polyether polyols formed from oxyalkylation of various polyols, for example, glycols such as ethylene glycol, 1,6-hexanediol, bisphenol A and the like, or other higher polyols such as trimethylolpropane, pentaerythritol, and the like. Polyols of higher functionality which can be utilized as indicated can be made, for instance, by oxyalkylation of compounds such as sucrose or sorbitol. One commonly utilized oxyalkylation method is reaction of a polyol with an alkylene oxide, for example, propylene or ethylene oxide, in the presence of an acidic or basic catalyst.

Examples of commercially available polyethers include those sold under the names TERATHANE and TERACOL, available from E. I. du Pont de Nemours and Company, Inc.

Polyurethanes can also be used as the resinous binder of the film-forming composition. Among the polyurethanes which can be used are polymeric polyols which are prepared by reacting the polyester polyols or acrylic polyols such as those mentioned above with a polyisocyanate such that the OH/NCO equivalent ratio is greater than 1:1 so that free hydroxyl groups are present in the product.

The organic polyisocyanate which is used to prepare the polyurethane polyol binder can be an aliphatic or an aromatic polyisocyanate or a mixture of the two. Diisocyanates and/or higher polyisocyanates are suitable.

Examples of suitable aromatic diisocyanates are 4,4'-diphenylmethane diisocyanate and toluene diisocyanate. Examples of suitable aliphatic diisocyanates are straight chain aliphatic diisocyanates such as 1,6-hexamethylene diisocyanate. Also, cycloaliphatic diisocyanates can be employed. Examples include isophorone diisocyanate and 4,4'-methylene-bis-(cyclohexyl isocyanate). Examples of suitable higher polyisocyanates are 1,2,4-benzene triisocyanate and polymethylene polyphenyl isocyanate.

The resinous binder is present in the film-forming composition in an amount of about 50 to about 90 percent by weight, preferably about 60 to about 80 percent by weight, based on the total weight of resin solids in the film-forming composition.

The film-forming composition of the present invention may also contain adjuvant curing agents such as aminoplasts and polyisocyanates. Aminoplasts are obtained from the reaction of formaldehyde with an amine or amide. The most common amines or amides are melamine, urea, or benzoguanamine. While the aldehyde used is most often formaldehyde, other aldehydes such as acetaldehyde, crotonaldehyde, and benzaldehyde may be used.

The aminoplast contains imino and methylol groups. Often at least a portion of the methylol groups are etherified with an alcohol to modify the cure response. Any monohydric alcohol may be employed for this purpose including methanol, ethanol, n-butanol, isobutanol, and hexanol.

If the adjuvant crosslinking agent is a polyisocyanate, the polyisocyanate can be one or more of those disclosed above used to prepare the active ester compound.

If the polyisocyanate is capped, any suitable aliphatic, cycloaliphatic, or aromatic alkyl monoalcohol known to those skilled in the art may be used as a capping agent for the polyisocyanate. Other suitable capping agents include oximes and lactams.

When used, the adjuvant crosslinking agent is present in the film-forming composition in an amount from about 1 to about 10 percent by weight based on the total weight of resin solids in the film-forming composition.

Catalysts that are suitable for use in the film-forming composition of the present invention include inter alia, ammonium compounds such as benzyltrimethyl ammonium hydroxide, organotin compounds such as dibutyltin dilaurate and di- or trialkyltin oxides, titanium complexes such as butyl titanate or triethanolamine titanate, ferric acetylacetonate, zinc acetate, and lead octoate, and tertiary amnines including, for example, N,N-dimethyl cocoamine.

The choice of specific catalysts depends on the functionality of the resinous binder in the film-forming composition. As noted earlier, not intending to be bound by theory, it is believed that the active ester compounds of the present invention may react with amino and ketimine groups via an amidation reaction mechanism, and catalysts that are typically used for amidation reactions are most effective. Film-forming compositions containing the composition of the present invention and amino and/or ketimine functional resinous binders may be cured at ambient temperature (e.g., 20 to 25° C.) or heated up to about 80° C. as desired. Again, not intending to be bound by theory, the active ester compound of the present invention may react with hydroxyl groups by transesterification or by deblocking as an isocyanate and undergoing an isocyanate-hydroxyl reaction mechanism. Film-forming compositions containing the composition of the present invention and hydroxyl functional resinous binders may be cured at temperatures of about 140 to about 275° F. (about 60 to about 135° C.), significantly lower than the temperatures required to cure conventional blocked polyisocyanates and polyols.

The catalysts is present in the film-forming composition at an amount of about 0.1 to about 3 percent, preferably about 1 to about 2 percent by weight, based on the total weight of resin solids in the film-forming composition.

Optional ingredients such as, for example, plasticizers, surfactants, thixotropic agents, anti-gassing agents, organic cosolvents, flow controllers, anti-oxidants, UV light absorbers and similar additives conventional in the art may be included in the composition. These ingredients are typically present at up to 40% by weight based on the total weight of resin solids.

The film-forming composition of the present invention may be a one- or two-package composition. When the resinous binder contains amino and ketimine groups, the film-forming composition is preferably a two-package composition (one package comprising the crosslinking agent and the other comprising the resinous binder) in order to maintain storage stability.

The film-forming composition of the present invention is typically used as a clear coat applied alone to a substrate or on top of a colored base coat. Alternatively, the composition may contain color pigments conventionally used in surface coatings and may be used as a base coat or high gloss monocoat; that is, a high gloss pigmented coating. By "high gloss" it is meant that the cured coating has a 20° gloss and/or a DOI ("distinctness of image") measurement of at least about 80 as measured by standard techniques known to those skilled in the art. Such standard techniques include ASTM D523 for gloss measurement and ASTM E430 for DOI measurement.

Color pigments conventionally used in surface coatings are suitable and include, for example, inorganic pigments such as titanium dioxide, iron oxides, chromium oxide, lead chromate, and carbon black, and organic pigments such as phthalocyanine blue and phthalocyanine green. Mixtures of the above mentioned pigments may also be used. Suitable metallic pigments include in particular aluminum flake, copper bronze flake and metal oxide coated mica, nickel flakes, tin flakes, and mixtures thereof.

When present, the pigment is incorporated into the coating composition in amounts of about 1 to about 80 percent by weight based on the total weight of coating solids. The metallic pigment is employed in amounts of about 0.5 to about 25 percent by weight based on the total weight of coating solids.

The film-forming compositions can be applied to various substrates to which they adhere including wood, metals, glass, and plastic. The compositions can be applied by conventional means including brushing, dipping, flow coating, spraying and the like, but they are most often applied by spraying. The usual sdray techniques and equipment for air spraying and electrostatic spraying and either manual or automatic methods can be used.

During application of the film-forming composition to the substrate, a film is formed on the substrate. Typically, the coating thickness will be about 0.01 to about 5 mils (about 0.254 to about 127 microns), preferably about 0.1 to about 2 mils (about 2.54 to about 50.8 microns) in thickness.

After application of the composition to the substrate, a film is formed on the surface of the substrate by driving solvent, i. e., organic solvent and/or water, out of the film by heating or by an air drying period ("flashing"). More than one coating layer, including multiple top coats may be applied to develop the optimum appearance. Usually between coats, the previously applied coat is flashed at ambient conditions for about 1 to 20 minutes.

After application of the composition to the substrate, the coated substrate may be heated if necessary to cure the coating layer(s). In the curing operation, solvents are driven off and the film-forming materials of the film-forming composition are crosslinked. The heating or curing operation is usually carried out at a temperature in the range of about 77–175° F. (25–79.4° C.) to activate crosslinking mechanisms, depending on the functionality of the resinous binder.

The invention will be further described by reference to the following example, which illustrates the preparation of an active ester compound.

EXAMPLE

Into a 1-liter, 4-necked, round bottom flask equipped with a stirrer, condenser, thermometer, heating mantle, dropping funnel and a nitrogen inlet were charged DESMODUR N 3400 (190 grams, 1 equiv., a mixture of isocyanurate and biuret of hexane diisocyanate available from Bayer Corporation), glyoxylic acid methyl ester methyl hemiacetal (110 grams, 1.06 equiv.), dibutyltindilaurate (DBTDL, 0.3 grams, 0.1%) and the mixture was slowly heated to 50° C. The reaction was allowed to exotherm, controlling the temperature below 80° C. using external cooling. When the exotherm was over the reaction mixture was held at 70° C. for 3–4 hours, at which point no residual isocyanate was detectable by infrared spectroscopy.

The adduct thus obtained was cooled and thinned to 75% solids with PM acetate.

We claim:

1. A compound having the structure:

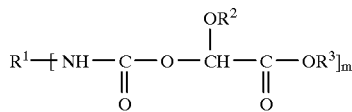

wherein:
$R^1$ is derived from a polyisocyanate $R^1(NCO)_m$ reacted with an active hydrogen-containing material to form the urethane group in the compound;

m is an integer of at least 2; and $R^2$ and $R^3$ are independently alkyl groups having from 1 to 4 carbon atoms.

2. The compound of claim 1 wherein $R^2$ and $R^3$ are methyl groups.

3. The compound of claim 1 wherein said compound is a reaction product of methyl hemiacetal of methyl glyoxylate and a polyisocyanate.

4. The compound of claim 3 wherein said polyisocyanate is selected from the group consisting of an isocyanurate of isophorene diisocyanate, an isocyanurate of hexamethylene diisocyanate, a biuret of hexamethylene diisocyanate, and mixtures thereof.

5. A curable film-forming composition comprising
a) a compound having the structure:

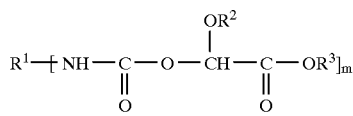

wherein:
$R^1$ is derived from a polyisocyanate $R^1(NCO)_m$ reacted with an active hydrogen-containing material to form the urethane group in the compound;

m is an integer of at least 2; and $R^2$ and $R^3$ are independently alkyl groups having from 1 to 4 carbon atoms;

b) a resinous binder containing active hydrogen groups; and c) a catalyst.

6. The curable film-forming composition of claim 5 wherein said catalyst is selected from the group consisting of dibutyltin dilaurate, butyl stannoic acid, dibutyltin oxide, N,N-dimethyl cocoamine, and mixtures thereof.

7. The curable film-forming composition of claim 6, wherein said film-forming composition is curable at room temperature.

8. The curable film-forming composition of claim 7 wherein said resinous binder contains amino and/or ketimine groups.

9. The curable film-forming composition of claim 8 wherein said film-forming composition comprises two packages.

10. The curable film-forming composition of claim 6 wherein said resinous binder contains hydroxyl functional groups.

11. The curable film-forming composition of claim 5, further comprising an adjuvant crosslinking agent.

12. The curable film-forming composition of claim 11 wherein said adjuvant crosslinking agent is present in the film-forming composition in an amount from about 1 to about 10 percent by weight based on the total weight of resin solids in the film-forming composition.

* * * * *